United States Patent
Chen et al.

(10) Patent No.: US 10,396,875 B2
(45) Date of Patent: Aug. 27, 2019

(54) CHANNEL STATE INFORMATION FEEDBACK AND RECEIVING METHOD AND DEVICE

(71) Applicant: CHINA ACADEMY OF TELECOMMUNICATIONS TECHNOLOGY, Beijing (CN)

(72) Inventors: Wenhong Chen, Beijing (CN); Shanzhi Chen, Beijing (CN); Qiubin Gao, Beijing (CN); Runhua Chen, Beijing (CN); Tamrakar Rakesh, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 36 days.

(21) Appl. No.: 15/749,122

(22) PCT Filed: Jul. 21, 2016

(86) PCT No.: PCT/CN2016/090874
§ 371 (c)(1),
(2) Date: Jan. 31, 2018

(87) PCT Pub. No.: WO2017/020730
PCT Pub. Date: Feb. 9, 2017

(65) Prior Publication Data
US 2018/0227030 A1    Aug. 9, 2018

(30) Foreign Application Priority Data

Jul. 31, 2015 (CN) .......................... 2015 1 0463618

(51) Int. Cl.
*H04W 24/10*    (2009.01)
*H04B 7/06*    (2006.01)
(Continued)

(52) U.S. Cl.
CPC ......... *H04B 7/0626* (2013.01); *H04B 7/0639* (2013.01); *H04B 7/0645* (2013.01);
(Continued)

(58) Field of Classification Search
CPC . H04W 24/10; H04W 72/04; H04W 72/0406; H04L 5/00; H04L 5/0057; H04B 7/06
See application file for complete search history.

(56) References Cited

U.S. PATENT DOCUMENTS

2012/0188976 A1* 7/2012 Kim ..................... H04L 1/0025
                                                                         370/329
2012/0270535 A1* 10/2012 Chen .................... H04W 24/10
                                                                         455/422.1
(Continued)

FOREIGN PATENT DOCUMENTS

CN     102281131 A    12/2011
CN     103168489 A     6/2013
(Continued)

OTHER PUBLICATIONS

LG Electronics, "3GPP TSG RAN WG1 Meeting #76 R1-140297", Remaining Details of CSI Measurement and Report for TDD eIMTA, Feb. 14, 2014 (Feb. 14, 2014).

*Primary Examiner* — Chi Ho A Lee
*Assistant Examiner* — Andrew Lee
(74) *Attorney, Agent, or Firm* — Kilpatrick Townsend & Stockton LLP (57) ABSTRACT

The present application provides a channel state information (CSI) feedback and receiving method and device. The CSI feedback method by a UE comprises: determining, according to an indication of a base station, at least one CSI feedback configuration group configured by the base station, wherein each CSI feedback configuration group comprises at least one CSI feedback configuration; and upon determination of a need to report CSI, reporting, via a PUCCH or
(Continued)

PUSCH, to the base station CSI acquired based on a first CSI feedback configuration, wherein the first CSI feedback configuration is a CSI feedback configuration determined, according to location information of a CSI feedback configuration in the most recent report or location information of a CSI feedback configuration indicated by the base station, from a corresponding CSI feedback configuration group by the UE. The present application supports independent reporting of location information and corresponding CSI, thus improving the detection performance of such information, and further supports a base station to acquire CSI corresponding to a specified CSI feedback configuration, thus enabling more flexible downlink scheduling and transmission.

20 Claims, 5 Drawing Sheets

(51) Int. Cl.
*H04L 1/00* (2006.01)
*H04L 5/00* (2006.01)

(52) U.S. Cl.
CPC .............. *H04L 1/00* (2013.01); *H04L 1/0026* (2013.01); *H04L 1/0027* (2013.01); *H04L 5/0057* (2013.01)

(56) References Cited

U.S. PATENT DOCUMENTS

| | | | |
|---|---|---|---|
| 2013/0028182 A1 | 1/2013 | Geirhofer et al. | |
| 2013/0028192 A1* | 1/2013 | Cheng | H04L 1/004 370/328 |
| 2013/0121308 A1* | 5/2013 | Dhingra | H04W 36/0072 370/331 |
| 2013/0121312 A1* | 5/2013 | Roman | H04B 7/0486 370/335 |
| 2014/0079146 A1 | 3/2014 | Kim et al. | |
| 2014/0328266 A1* | 11/2014 | Yu | H04L 5/0053 370/329 |
| 2016/0249244 A1* | 8/2016 | Xia | H04L 1/0023 |
| 2017/0195029 A1* | 7/2017 | Nammi | H04B 7/0456 |
| 2017/0289831 A1* | 10/2017 | Park | G01S 5/02 |
| 2018/0183505 A1* | 6/2018 | Kim | H04B 7/0695 |
| 2018/0302834 A1* | 10/2018 | Zhang | H04W 36/08 |

FOREIGN PATENT DOCUMENTS

| | | |
|---|---|---|
| CN | 103391127 A | 11/2013 |
| CN | 103516464 A | 1/2014 |
| CN | 103580819 A | 2/2014 |
| CN | 104038312 A | 9/2014 |
| CN | 104811231 A | 7/2015 |
| CN | 105471546 A | 4/2016 |
| EP | 2852072 A1 | 3/2015 |
| EP | 2869478 A1 | 5/2015 |

* cited by examiner

CHANNEL STATE INFORMATION FEEDBACK AND RECEIVING METHOD AND DEVICE

This application is a U.S. National Stage of International Application No. PCT/CN2016/090874, filed on Jul. 21, 2016, designating the United States and claiming priority to Chinese Patent Application No. CN201510463618.6, filed with the Chinese Patent Office on Jul. 31, 2015 and entitled "A method and apparatus for feeding back channel state information (CSI), and a method and apparatus for receiving CSI", the content of which is hereby incorporated by reference in its entirety.

FIELD

The present disclosure relates to the field of wireless communication technology, particularly to a method and apparatus for feeding back CSI, and a method and apparatus for receiving CSI.

BACKGROUND

Figure 1:
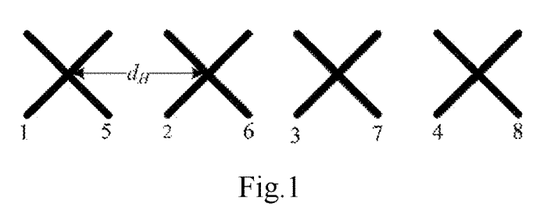
FIG. 1 is a schematic diagram of conventional dual-polarized antennas arranged horizontally.
Figure 2:
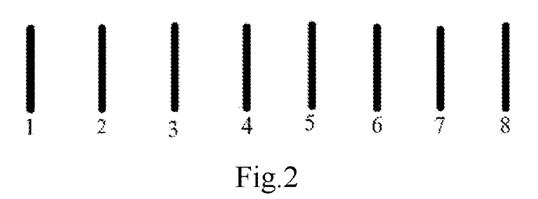
FIG. 2 is a schematic diagram of a conventional array of antennas arranged horizontally.

In an existing cellular system, an array of antennas of a base station is generally arranged horizontally as illustrated by FIG. 1 and FIG. 2. A beam emitted by a transmitter of the base station can only be adjusted in the horizontal direction, and has a fixed dip in the vertical direction, so various beam-forming/pre-coding technologies, etc., operate on the basis of information about a channel in the horizontal direction. In fact, since a radio signal is propagated in three dimensions in space, the performance of the system cannot be optimized with the fixed dip, and adjustment of the beam in the vertical direction is of great significance to reduction in inter-cell interference, and to improvement in performance of the system.

Figure 3A:
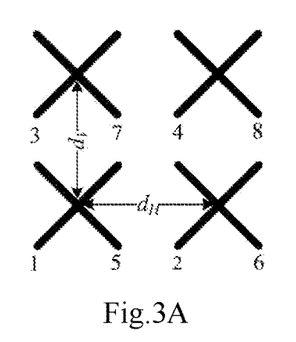
FIG. 3A is a schematic diagram of conventional dual-polarized antennas arranged in the horizontal and vertical directions.
Figure 3B:
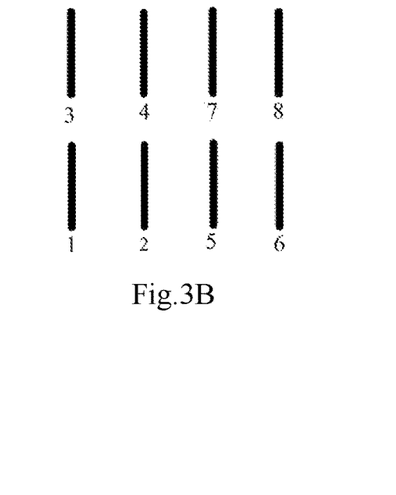
FIG. 3B is a schematic diagram of a conventional array of antennas arranged in the horizontal and vertical directions.

With the development of antenna technologies, active antennas in which each antenna oscillator can be controlled separately has emerged in the industry as illustrated by FIG. 3A and FIG. 3B. With this array of antenna, it becomes possible to adjust the beam dynamically in the vertical direction.

In such a three-dimension array of antennas, beam-forming in both the horizontal direction and the vertical direction can be performed on a signal transmitted by the base station to a user equipment (UE). In order to enable an evolved Node B (eNB) to determine a beam-forming vector in the vertical direction so that the beam in the vertical direction is oriented to the UE to maximum a beam-forming gain, the UE typically needs to feed back CSI in the vertical direction. In a particular implementation, the UE is configured with a plurality of CSI feedback configurations, and different CSI feedback configurations use different vertical beam-forming vectors, and the UE measures and feeds back CSI based upon the configured CSI feedback configurations. Here the CSI generally includes a rank indicator (RI), a pre-coding matrix indicator (PMI), and a channel quality indicator (CQI).

Particular operations are introduced below.

Firstly the base station determines N non-zero power (NZP) channel state information reference signal (CSI-RS) resources, each CSI-RS resource has the same number of ports and the same number of groups of antenna elements for each CSI-RS resource, and each port of each CSI-RS resource corresponds to one group of antenna elements, for example, the first port corresponds to the first column of vertical antennas, the second port corresponds to the second column of vertical antennas, and so on. The base station determines a beam-forming weight vector for each CSI-RS resource, and the beam-forming weight vector can be determined by a vertical angle to be covered by the CSI-RS resource. For each port of the CSI-RS resource, a pilot signal thereof is weighted by the beam-forming vector, and then transmitted from the group of antenna elements corresponding to the port.

Figure 4:
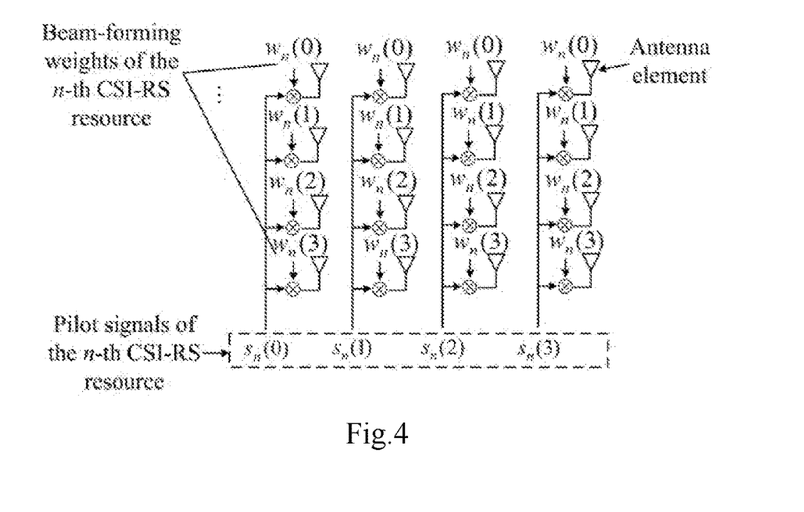
FIG. 4 is a schematic diagram of conventional CSI-RS transmission via a plurality of CSI-RS antenna ports.

As illustrated by FIG. 4, for example, there are 16 antenna elements in total, and four antenna elements in the vertical direction are defined as a group. So each group has four antenna elements and there are four groups in total. Each group of antenna elements are configured to transmit pilot signals of a port of a CSI-RS resource. A pilot signal $s_n(i)$ of the i-th port is weighted by a beam-forming weight vector $[w_n(0)\ w_n(1)\ w_n(2)\ w_n(3)]^T$, and then transmitted from the i-th group of antennas, i.e., the i-th column of antennas. The subscript n in FIG. 4 distinguishes one CSI-RS resource from another CSI-RS resource. If the base station is configured with three CSI-RS resources, and each CSI-RS resource has a different beam direction, three different sets of beam-forming weight vectors $[w_n(0)\ w_n(1)\ w_n(2)\ w_n(3)]^T$ needs to be configured, where n=0, 1, 2. The UE can measure respectively on the basis of these three groups of CSI-RS resources, and report CSI measured over a CSI-RS resource with the best channel quality and positional information of that CSI-RS resource among all the configured CSI-RS resources. The base station can obtain a current optimum vertical beam-forming weight vector according to the positional information to perform vertical beam-forming of data.

In a Long Term Evolution (LTE) system, in order to support cooperative multiple-point transmission (CoMP), the concept of CSI process is introduced. Each CSI process can correspond to an NZP CSI-RS configuration and an interference measurement resource (IMR) configuration. The UE measures a channel based upon the NZP CSI-RS and measures interference using the corresponding IMR to obtain and feed back CSI corresponding to each CSI processes. Each LTE UE can be configured with at most three CSI processes to feed back CSI. The UE can feed back CSI over a periodical physical uplink control channel (PUCCH), or over an aperiodic physical uplink shared channel (PUSCH). To feed back CSI periodically, the base station configures a periodical PUCCH resource, and the UE reports corresponding CIS periodically over the configured resource. In order to feed back CSI aperiodically, the base station triggers the UE to feed back CSI via Downlink Control Information (DCI), and the UE feeds back the CSI over a PUSCH in an uplink sub-frame corresponding to the triggering sub-frame. To feed back CSI aperiodically, the base station can trigger the UE to report CSI corresponding to each CSI process in a certain set of CSI processes, where the UE is pre-configured with the set of CSI processes via higher-layer signaling, and the UE is triggered via DCI. A plurality of sets of CSI processes are configured also to enable the UE to feed back CSI corresponding to a plurality of CSI-RSes obtained after beam-forming using different vertical beam-forming vectors.

In the existing solution, schemes to report positional information and CSI to the base station respectively in different feedback modes are not supported, schemes of the base station triggering the UE via triggering signaling to feed back CSI in a specified CSI feedback configuration are not supported, either, thus discouraging the base station from more flexible downlink scheduling and transmission.

SUMMARY

Embodiments of the disclosure provide a method and apparatus for feeding back CSI, and a method and apparatus for receiving CSI so as to support separate reports of positional information and corresponding CSI to improve the performance of detecting such information.

An embodiment of the disclosure provides for feeding back CSI by a UE, the method includes the following operations: determining at least one set of CSI feedback configurations configured by a base station according to an indication of the base station, where each set of CSI feedback configurations includes at least one CSI feedback configuration, and the CSI feedback configuration is a downlink signal configuration for downlink CSI measurement and feedback; and reporting CSI obtained based upon a first CSI feedback configuration to the base station over a PUCCH or a PUSCH upon determining that the CSI needs to be reported, where the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

Optionally, the CSI feedback configuration is a CSI process, or a Non-Zero Power Channel State Information Reference Signal (NPZ CSI-RS) configuration, or an IMR configuration.

Optionally, the first CSI feedback configuration is a CSI feedback configuration corresponding to positional information of the CSI feedback configuration most recently reported by the UE over a PUCCH.

Optionally, the first CSI feedback configuration is a CSI feedback configuration corresponding to positional information of the CSI feedback configuration most recently reported by the UE over a PUSCH.

Optionally, the first CSI feedback configuration is a CSI feedback configuration corresponding to most recently reported positional information of the CSI feedback configuration among positional information of CSI feedback configurations reported by the UE over a PUCCH and a PUSCH.

Optionally, the most recently reported positional information of the CSI feedback configurations are most recently reported indexes of the CSI feedback configurations in corresponding sets of CSI feedback configurations which the CSI feedback configurations belong to.

Optionally, the most recently reported positional information of the CSI feedback configuration is a most recently reported sequence of positions corresponding to the set of CSI feedback configurations which the CSI feedback configuration belongs to. One set of CSI feedback configurations corresponds to one sequence of positions and each CSI feedback configuration in the set of CSI feedback configurations corresponds to one bit in the sequence of positions. The UE most recently reports the positional information by setting a bit corresponding to the CSI feedback configuration to be reported in the sequence of positions to a preset value, and then reporting the sequence of positions to the base station.

Optionally, the positional information of the CSI feedback configuration indicated by the base station is an index of the CSI feedback configuration in the set of CSI feedback configurations which the CSI feedback configuration belongs to.

Optionally, the positional information of the CSI feedback configuration indicated by the base station is a sequence of positions corresponding to the set of CSI feedback configurations which the CSI feedback configuration belongs to. One set of CSI feedback configurations corresponds to one sequence of positions and each CSI feedback configuration in the set of CSI feedback configurations corresponds to one bit in the sequence of positions. The base station indicates the positional information by setting a bit corresponding to the CSI feedback configuration to be reported in the sequence of position to a preset value, and then transmitting the sequence of positions to the UE.

Optionally, the UE determines the positional information of the CSI feedback configuration indicated by the base station via aperiodic CSI triggering signaling or higher-layer signaling transmitted by the base station.

Optionally, the method further includes the following operation: receiving downlink control signaling transmitted by the base station.

Optionally, the downlink control signaling instructs the UE to determine the first CSI feedback configuration based upon the most recently reported positional information of the CSI feedback configuration.

Optionally, the downlink control signaling instructs the UE to determine the first CSI feedback configuration according to the positional information of the CSI feedback configuration indicated by the base station.

An embodiment of the disclosure provides a method for receiving CSI by a base station and the method includes the following operations: configuring a UE with at least one set of CSI feedback configurations, and indicating the at least one set of CSI feedback configurations to the UE, where each set of CSI feedback configurations includes at least one CSI feedback configuration, and the CSI feedback configuration is a downlink signal configuration for downlink CSI measurement and feedback; and receiving CSI, obtained based upon a first CSI feedback configuration and reported by the UE over a PUCCH or a PUSCH, where the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

Optionally, the CSI feedback configuration is a CSI process, or a NPZ CSI-RS configuration, or an IMR configuration.

Optionally, the first CSI feedback configuration is a CSI feedback configuration corresponding to positional information of the CSI feedback configuration most recently reported by the UE over a PUCCH.

Optionally, the first CSI feedback configuration is a CSI feedback configuration corresponding to positional information of the CSI feedback configuration most recently reported by the UE over a PUSCH.

Optionally, the first CSI feedback configuration is a CSI feedback configuration corresponding to most recently reported positional information of the CSI feedback configuration among positional information of CSI feedback configurations reported by the UE over a PUCCH and a PUSCH.

Optionally, the method further includes the following operation: transmitting downlink control signaling to the UE.

Optionally, the downlink control signaling instructs the UE to determine the first CSI feedback configuration based upon the most recently reported positional information of the CSI feedback configuration.

Optionally, the downlink control signaling instructs the UE to determine the first CSI feedback configuration according to the positional information of the CSI feedback configuration indicated by the base station.

An embodiment of the disclosure provides a UE. The UE includes a configuration determining unit and a CSI reporting unit. The configuration determining unit is configured to determine at least one set of CSI feedback configurations configured by a base station according to an indication of the base station. Each set of CSI feedback configurations includes at least one CSI feedback configuration, and the CSI feedback configuration is a downlink signal configuration for downlink CSI measurement and feedback. The CSI reporting unit is configured to report CSI obtained based upon a first CSI feedback configuration to the base station over a PUCCH or a PUSCH upon determining that the CSI needs to be reported, where the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

Optionally, the CSI feedback configuration is a CSI process, or a NPZ CSI-RS configuration, or an IMR configuration.

Optionally, the first CSI feedback configuration is a CSI feedback configuration corresponding to positional information of the CSI feedback configuration most recently reported by the UE over a PUCCH.

Optionally, the first CSI feedback configuration is a CSI feedback configuration corresponding to positional information of the CSI feedback configuration most recently reported by the UE over a PUSCH.

Optionally, the first CSI feedback configuration is a CSI feedback configuration corresponding to most recently reported positional information of the CSI feedback configuration among positional information of CSI feedback configurations reported by the UE over a PUCCH and a PUSCH.

Optionally, the most recently reported positional information of the CSI feedback configurations are most recently reported indexes of the CSI feedback configurations in corresponding sets of CSI feedback configurations which the CSI feedback configurations belong to.

Optionally, the most recently reported positional information of the CSI feedback configuration is a most recently reported sequence of positions corresponding to the set of CSI feedback configurations which the CSI feedback configuration belongs to. One set of CSI feedback configurations corresponds to one sequence of positions and each CSI feedback configuration in the set of CSI feedback configurations corresponds to one bit in the sequence of positions. The UE most recently reports the positional information by setting a bit corresponding to the CSI feedback configuration to be reported in the sequence of positions to a preset value, and then reporting the sequence of positions to the base station.

Optionally, the positional information of the CSI feedback configuration indicated by the base station is an index of the CSI feedback configuration in the set of CSI feedback configurations which the CSI feedback configuration belongs to.

Optionally, the positional information of the CSI feedback configuration indicated by the base station is a sequence of positions corresponding to the set of CSI feedback configurations which the CSI feedback configuration belongs to, where one set of CSI feedback configurations corresponds to one sequence of positions, each CSI feedback configuration in the set of CSI feedback configurations corresponds to one bit in the sequence of positions, and the base station indicates the positional information by setting a bit corresponding to the CSI feedback configuration to be reported in the sequence of position to a preset value, and then transmitting the sequence of positions to the UE.

Optionally, the configuration determining unit is configured to determine the positional information of the CSI feedback configuration indicated by the base station via aperiodic CSI triggering signaling or higher-layer signaling transmitted by the base station.

Optionally, the UE further includes a signaling receiving unit. The signaling receiving unit is configured to receive downlink control signaling transmitted by the base station. The downlink control signaling instructs the UE to determine the first CSI feedback configuration based upon the most recently reported positional information of the CSI feedback configuration, or to determine the first CSI feedback configuration according to the positional information of the CSI feedback configuration indicated by the base station.

An embodiment of the disclosure provides a base station. The base station includes a configuring unit and a CSI receiving unit. The configuring unit is configured to configure a UE with at least one set of CSI feedback configurations, and to indicate the at least one set of CSI feedback configurations to the UE. Each set of CSI feedback configurations includes at least one CSI feedback configuration, and the CSI feedback configuration is a downlink signal configuration for downlink CSI measurement and feedback. The CSI receiving unit is configured to receive CSI, obtained based upon a first CSI feedback configuration and reported by the UE over a PUCCH or a PUSCH. The first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

Optionally, the CSI feedback configuration is a CSI process, or a NPZ CSI-RS configuration, or an IMR configuration.

Optionally, the first CSI feedback configuration is a CSI feedback configuration corresponding to positional information of the CSI feedback configuration most recently reported by the UE over a PUCCH.

Optionally, the first CSI feedback configuration is a CSI feedback configuration corresponding to positional information of the CSI feedback configuration most recently reported by the UE over a PUSCH.

Optionally, the first CSI feedback configuration is a CSI feedback configuration corresponding to most recently reported positional information of the CSI feedback configuration among positional information of CSI feedback configurations reported by the UE over a PUCCH and a PUSCH.

Optionally, the base station further includes an instructing unit. The instructing unit is configured to transmit downlink control signaling to the UE.

Optionally, the downlink control signaling instructs the UE to determine the first CSI feedback configuration based upon the most recently reported positional information of the CSI feedback configuration.

Optionally, the downlink control signaling instructs the UE to determine the first CSI feedback configuration according to the positional information of the CSI feedback configuration indicated by the base station.

The method and apparatus for feeding back CSI, and the method and apparatus for receiving CSI according to embodiments of the disclosure have the following advantageous effects: the embodiments of the disclosure supports independent reports of positional information and corresponding CSI to improve the performance of detecting such information; the UE could report CSI based upon a CSI feedback configuration specified by the base station, so that the base station can obtain CSI corresponding to a non-optimum CSI feedback configuration, and perform downlink scheduling and transmission more flexibly.

DETAILED DESCRIPTION OF THE EMBODIMENTS

The method and apparatus for feeding back CSI, and the method and apparatus for receiving CSI according to the embodiments of the disclosure are described below in further details with reference to the drawings.

Figure 5:
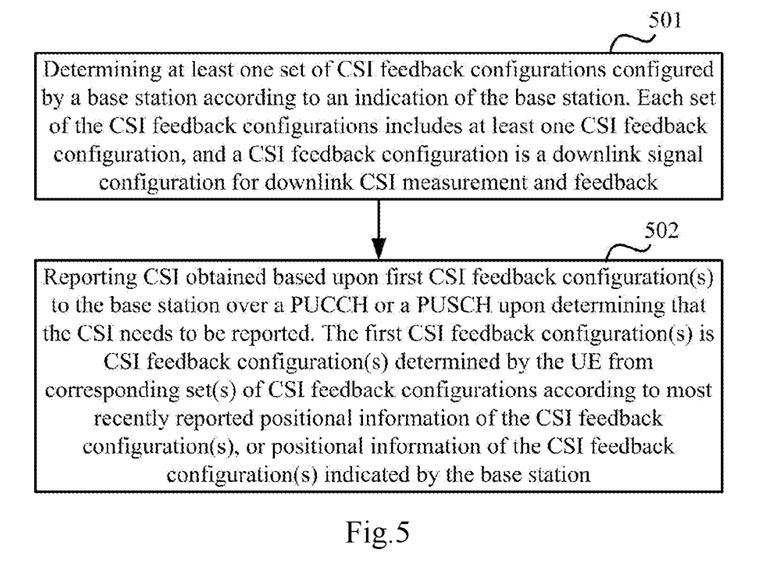
FIG. 5 is a flow chart of a method for feeding back CSI by a UE according to an embodiment of the disclosure.

An embodiment of the disclosure provides a method for feeding back CSI by a UE, and as illustrated in FIG. 5, the method includes the following operations.

The operation 501 is determining at least one set of CSI feedback configurations configured by a base station according to an indication of the base station. Each set of the CSI feedback configurations includes at least one CSI feedback configuration, and a CSI feedback configuration is a downlink signal configuration for downlink CSI measurement and feedback.

The base station can configure one or more sets of CSI feedback configurations, and each set of CSI feedback configurations includes one or more CSI feedback configurations.

Particularly a CSI feedback configuration is a CSI process, a NPZ CSI-RS configuration, or an IMR configuration.

So a set of CSI feedback configurations can include any combination of the above-mentioned CSI feedback configurations, for example, the set of CSI feedback configurations can include a plurality of NZP CSI-RS configurations and an IMR configuration.

One CSI process corresponds to at least one NZP CSI-RS configuration and one IMR configuration.

Of course, a CSI feedback configuration can also be another downlink reference signal and/or downlink measurement resource configuration for downlink CSI measurement and feedback.

A CSI feedback configuration includes at least one NZP CSI-RS configuration. Optionally, different beam-forming vectors for beam-forming are applied to NZP CSI-RS's in different CSI feedback configurations.

When a set of CSI feedback configurations includes a plurality of CSI feedback configurations, the set of CSI feedback configurations can further include related configuration information common to the plurality of CSI feedback configurations.

Following are some examples.

In a first example, the base station configures one set of CSI feedback configurations, and the set of CSI feedback configures can include a plurality of CSI processes or a plurality of NZP CSI-RS's. In addition to a plurality of CSI feedback configurations, a set of CSI feedback configurations can also include related configuration information common to the plurality of CSI feedback configurations. For example, the set of CSI feedback configurations can include a plurality of NZP CSI-RS configurations, and an IMR configuration associated with the plurality of NZP CSI-RS configurations.

In a second example, the base station can configure three sets of CSI feedback configurations. Each of the three sets of CSI feedback configurations includes four NZP CSI-RS configurations, and can further include an IMR configuration associated with all of the four NZP CRI-RS configurations.

The base station can transmit higher-layer signaling to the UE, and the UE can determine at least one set of CSI feedback configurations configured by the base station according to the higher-layer signaling transmitted by the base station.

The operation 502 is reporting CSI obtained based upon first CSI feedback configuration(s) to the base station over a PUCCH or a PUSCH upon determining that the CSI needs to be reported. The first CSI feedback configuration(s) is CSI feedback configuration(s) determined by the UE from corresponding set(s) of CSI feedback configurations according to most recently reported positional information of the CSI feedback configuration(s), or positional information of the CSI feedback configuration(s) indicated by the base station.

In the embodiment of the disclosure, when determining that the CSI needs to be reported, the UE determines CSI feedback configuration(s) for which CSI needs to be reported, according to the most recently reported positional information of the CSI feedback configuration(s), or the positional information of the CSI feedback configuration(s) indicated by the base station. Since the base station has corresponding positional information, the UE reports the CSI obtained based upon the first CSI feedback configuration(s) to the base station without reporting the positional information of the first CSI feedback configuration(s).

In the embodiment of the disclosure, positional information and corresponding CSI can be reported separately to improve the performance of detecting such information. The UE can report CSI based upon a CSI feedback configuration specified by the base station, so that the base station can obtain CSI corresponding to a non-optimum CSI feedback configuration, and perform downlink scheduling and transmission more flexibly.

The embodiment of the disclosure does not limit which CSI feedback configuration whose positional information the UE can report and how the CSI feedback configuration is reported.

Optionally for each set of CSI feedback configurations, the UE can report periodically by reporting positional information of at least one CSI feedback configuration in the set of CSI feedback configurations over a PUCCH when a preset period arrives. The reported positional information of the CSI feedback configuration can be positional information of CSI feedback configuration(s) corresponding to one or more optimum CSI in the set of CSI feedback configurations, or can be positional information of each CSI feedback configuration in the set of CSI feedback configurations. Furthermore the corresponding CSI can be or does not have to be reported when the positional information is reported.

Optionally, for each set of CSI feedback configurations, the UE can report aperiodically positional information of at least one CSI feedback configuration in the set of CSI feedback configurations over a PUSCH upon reception of aperiodic CSI feedback triggering signaling transmitted by the base station. The reported positional information of the CSI feedback configuration(s) can be positional information of the CSI feedback configuration(s) corresponding to one or more optimum CSI in the set of CSI feedback configurations, or can be positional information of each CSI feedback configuration in the set of CSI feedback configurations. Furthermore the corresponding CSI can or does not have to be reported when the positional information is reported.

Optionally the first CSI feedback configuration(s) can be determined in the operation 501 in any one of the following ways.

1) The first CSI feedback configuration(s) is CSI feedback configuration(s) corresponding to positional information of the CSI feedback configuration(s) most recently reported by the UE over a PUCCH.

2) The first CSI feedback configuration(s) is CSI feedback configuration(s) corresponding to positional information of the CSI feedback configuration(s) most recently reported by the UE over a PUSCH.

3) The first CSI feedback configuration(s) is CSI feedback configuration(s) corresponding to most recently reported positional information of the CSI feedback configuration(s) among positional information of CSI feedback configurations reported by the UE over a PUCCH or a PUSCH. That is, if the UE reports positional information of a CSI feedback configuration over a PUCCH and reports positional information of a CSI feedback configuration over a PUSCH, then the CSI feedback configuration corresponds to the positional information of a CSI feedback configuration which is the most most recently reported over either PUCCH or PUSCH is determined as the first CSI feedback configuration.

In the first way of determining the first CSI feedback configuration(s), the base station can configure the UE with a set of CSI feedback configurations in a certain order. For example, the base station transmits indexes of CSI feedback configurations in the set of CSI feedback configurations at a time, so that the UE can determine which CSI feedback configurations belong to the same set of CSI feedback configurations.

Based upon different schemes for defining the positional information, the UE determines a first CSI feedback configuration from a set of CSI feedback configurations according to the positional information as follows.

I. If the positional information is defined as an index of a CSI feedback configuration in the set of CSI feedback configurations, then the UE determines the CSI feedback configuration corresponding to the index in the set of CSI feedback configurations as the first CSI feedback configuration.

II. If the positional information is defined as a sequence of positions, then the UE determines a CSI feedback configuration with a corresponding bit of a value "1" in the sequence of positions as the first CSI feedback configuration.

Optionally in the operation 502, the positional information of the CSI feedback configurations most recently reported by the UE are most recently reported indexes of CSI feedback configurations in their corresponding sets of CSI feedback configurations which the CSI feedback configurations belong to.

Or in the operation 502, the positional information of the CSI feedback configurations most recently reported by the UE are most recently reported sequences of positions corresponding to the sets of CSI feedback configurations which the CSI feedback configurations belong to. One set of CSI feedback configurations corresponds to one sequence of positions, each CSI feedback configuration in the set of CSI feedback configurations corresponds to one bit in the sequence of positions, and the UE most recently reports the positional information by setting the bits corresponding to the CSI feedback configurations to be reported in the sequence of positions to a preset value, and then reporting the sequence of positions to the base station.

Optionally the positional information of the CSI feedback configuration indicated by the base station is an index of the CSI feedback configuration in the set of CSI feedback configurations which the CSI feedback configuration belongs to; or a sequence of positions corresponding to the set of CSI feedback configurations which the CSI feedback configuration belongs to. One set of CSI feedback configurations corresponds to one sequence of positions, each CSI feedback configuration in the set of CSI feedback configurations corresponds to one bit in the sequence of positions, and the base station indicates the positional information by setting the bit corresponding to the CSI feedback configuration to be reported in the sequence of position to a preset value, and then transmitting the sequence of positions to the UE.

Optionally determining the CSI feedback configuration from the corresponding set of CSI feedback configurations according to the positional information of the CSI feedback configuration indicated by the base station in the operation 502 can be implemented in the following ways.

If the positional information of the CSI feedback configuration indicated by the base station is the index of the CSI feedback configuration in the set of CSI feedback configurations which the CSI feedback configuration belongs to, then determining the CSI feedback configuration from the corresponding set of CSI feedback configurations according to the index. The base station can use aperiodic CSI feedback triggering signaling to carry the positional information. For example, if the set of CSI feedback configurations pre-configured by the base station includes four CSI-RS resources, then the positional information is index information of a target CSI-RS resource among the four resources, and the positional information occupies two bits.

If the positional information of the CSI feedback configuration indicated by the base station is the sequence of positions corresponding to the CSI feedback configuration, then the CSI feedback configuration is determined from the corresponding set of CSI feedback configurations according to the values of each bit in the sequence of position. One set of CSI feedback configurations corresponds to one sequence of positions, and each CSI feedback configuration in the set of CSI feedback configurations corresponds to one bit in the sequence of positions. The base station can indicate the positional information in advance via higher-layer signaling. Generally the base station can indicate positional information for each pre-configured set of CSI feedback configurations. For example, for each CSI process configured by the base station (including four CSI-RS resources), the base station can indicate the positional information of four bits, and the positions of the CSI-RS resources for which CSI needs to be fed back are indicated in a bitmap.

Here the first CSI feedback configuration can be one or more CSI feedback configurations in the set of CSI feedback configurations.

Optionally the positional information of the CSI feedback configuration indicated by the base station is determined via aperiodic CSI triggering signaling or higher-layer signaling transmitted by the base station in the operation 501.

Optionally it can be determined in the operation 501 that the CSI needs to be reported, in any one of the following ways.

1) It is determined that the CSI needs to be reported, upon reception of an aperiodic CSI feedback triggering instruction transmitted by the base station.

Particularly the positional information of the CSI feedback configuration can be reported aperiodically.

With the aperiodic CSI feedback triggering instruction, firstly a report of the positional information of the CSI feedback configuration is triggered, and then CSI is measured based upon the CSI feedback configuration, and the CSI information corresponding to the most recently reported positional information is fed back when a succeeding CSI feedback configuration instruction is received.

2) It is determined that the CSI needs to be reported, when a preset period arrives.

The positional information of the CSI feedback configuration can be reported periodically, CSI can be measured based upon the CSI feedback configuration after each report, and the CSI information corresponding to the most recently reported CSI positional information can be fed back when a next preset period arrives.

The method for feeding back CSI by a UE according to the embodiment of the disclosure is applicable to a full-dimension multiple input multiple output (FD-MIMO) system.

Optionally according to the embodiment, before the first CSI feedback configuration is determined, the method can further include the following operation: the UE receives downlink control signaling transmitted by the base station. The downlink control signaling instructs the UE to determine the first CSI feedback configuration based upon the most recently reported positional information of the CSI feedback configuration, or to determine the first CSI feedback configuration according to the positional information of the CSI feedback configuration indicated by the base station.

Then in the operation 502, the UE decides from the downlink control signaling whether to determine the first CSI feedback configuration based upon the most recently reported positional information of the CSI feedback configuration, or to determine the first CSI feedback configu-ration according to the positional information of the CSI feedback configuration indicated by the base station.

For example, the base station can indicate either of the positional information above to the UE in additional signaling of 1 bit in the DCI.

Figure 6:
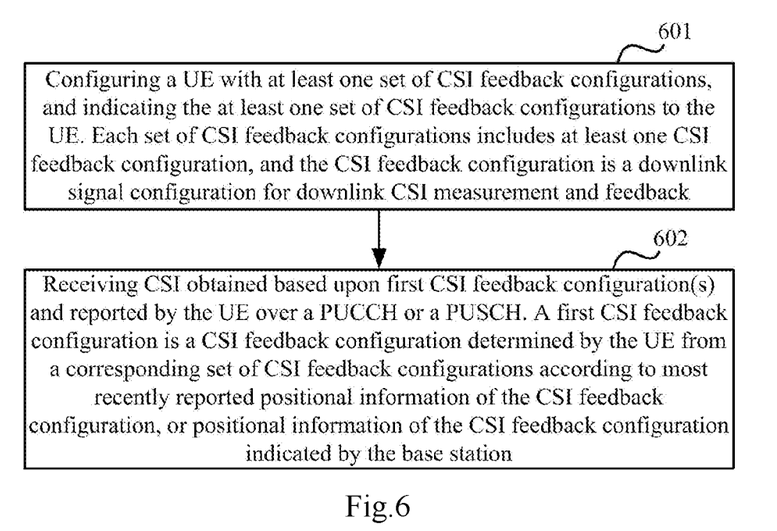
FIG. 6 is a flow chart of a method for receiving CSI by a base station according to an embodiment of the disclosure.

An embodiment of the disclosure provides a method for receiving CSI by a base station at the network side, and as illustrated in FIG. 6, the method includes the following operations.

The operation 601 is configuring a UE with at least one set of CSI feedback configurations, and indicating the at least one set of CSI feedback configurations to the UE. Each set of CSI feedback configurations includes at least one CSI feedback configuration, and the CSI feedback configuration is a downlink signal configuration for downlink CSI measurement and feedback.

The base station can configure one or more sets of CSI feedback configurations, and each set of CSI feedback configurations includes one or more CSI feedback configurations.

Particularly the CSI feedback configuration is a CSI process, or an NPZ CSI-RS configuration, or an IMR configuration, so the set of CSI feedback configurations can include any combination of the CSI feedback configurations above. For example, the set of CSI feedback configurations can include a plurality of NZP CSI-RS configurations and one IMR configuration.

One CSI process corresponds to at least one NZP CSI-RS configuration and one IMR configuration.

Of course, a CSI feedback configuration can also be another downlink reference signal and/or downlink measurement resource configuration for downlink CSI measurement and feedback.

A CSI feedback configuration includes at least one NZP CSI-RS configuration. Optionally different beam-forming vectors for beam-forming are applied to NZP CSI-RS's in different CSI feedback configurations.

When a set of CSI feedback configurations includes a plurality of CSI feedback configurations, the set of CSI feedback configurations can further include related configuration information common to the plurality of CSI feedback configurations.

Particular examples are given below.

In a first example, the base station configures one set of CSI feedback configurations, which can include a plurality of CSI processes or a plurality of NZP CSI-RS's. In addition to a plurality of CSI feedback configurations, a set of CSI feedback configurations can also include related configuration information common to the plurality of CSI feedback configurations. For example, the set of CSI feedback configurations can include a plurality of NZP CSI-RS configurations, and an IMR configuration associated with the plurality of NZP CSI-RS configurations.

In a second example, the base station can configure three sets of CSI feedback configurations. Each of the three sets of CSI feedback configurations include four NZP CSI-RS configurations, and can further include an IMR configuration associated with all of the four NZP CSI-RS configurations.

The base station can transmit higher-layer signaling to the UE, and the UE can determine at least one set of CSI feedback configurations configured by the base station according to the higher-layer signaling transmitted by the base station.

Given a plurality of carriers, the base station can configure each carrier with a set of CSI feedback configurations, or can configure all the carriers with the same set of CSI feedback configurations.

The operation 602 is receiving CSI obtained based upon first CSI feedback configuration(s) and reported by the UE over a PUCCH or a PUSCH. The first CSI feedback configuration(s) is CSI feedback configuration(s) determined by the UE from corresponding set(s) of CSI feedback configurations according to most recently reported positional information of the CSI feedback configuration(s), or positional information of the CSI feedback configuration(s) indicated by the base station.

Optionally a first CSI feedback configuration is a CSI feedback configuration corresponding to positional information of the CSI feedback configuration most recently reported by the UE over a PUCCH.

Or a first CSI feedback configuration is a CSI feedback configuration corresponding to positional information of the CSI feedback configuration most recently reported by the UE over a PUSCH.

Or a first CSI feedback configuration is a CSI feedback configuration corresponding to most recently reported positional information of the CSI feedback configuration among positional information of CSI feedback configurations reported by the UE over a PUCCH and a PUSCH.

Optionally the method further includes: transmitting downlink control signaling to the UE. The downlink control signaling instructs the UE to determine the first CSI feedback configuration(s) based upon the most recently reported positional information of the CSI feedback configuration(s), or to determine the first CSI feedback configuration(s) according to the positional information of the CSI feedback configuration(s) indicated by the base station.

The base station can trigger the UE to feed back CSI, for example, when the UE is triggered aperiodically, the base station can transmit an aperiodic CSI feedback triggering instruction to the UE, where the base station firstly receives positional information of CSI fed back by the UE, and then transmits the aperiodic CSI feedback triggering instruction, and receives the CSI with the corresponding positional information fed back by the UE.

The embodiments of the disclosure provide a method for feeding back CSI and a method for receiving CSI, applicable to an FD-MIMO system. After the base station triggers the UE to feed back CSI, the UE reports the corresponding CSI based upon the CSI feedback configuration corresponding to the most recently reported positional information, or the CSI feedback configuration specified by the base station.

Aperiodic CSI can be fed back by performing CSI measurement and reporting according to the positional information reported by periodical CSI feedback, so that an aperiodic CSI report based upon an optimum beam can be supported without apparently modifying an existing aperiodic CSI feedback mechanism.

This mechanism can support separate reports of positional information and corresponding CSI to improve the performance of detecting such information.

The UE can report the CSI based upon a CSI feedback configuration specified by the base station, so that the base station can obtain the CSI corresponding to the non-optimum CSI feedback configuration, and perform downlink scheduling and transmission more flexibly.

Optional embodiments of the method for feeding back CSI and the method for receiving CSI according to the disclosure are given below.

First Embodiment

In this embodiment, CSI feedback is triggered by using an aperiodic CSI feedback triggering instruction. A UE firstly reports positional information of a CSI feedback configuration according to the aperiodic CSI feedback triggering instruction transmitted by a base station, and then measures CSI based upon the CSI feedback configuration corresponding to the reported positional information, and reports the CSI corresponding to the positional information the next time when an aperiodic CSI feedback triggering instruction is received, particularly in the following operations.

Operation 1): the base station indicates to the UE a CSI process for aperiodic CSI feedback via higher-layer signaling. The CSI process includes four CSI-RS resource configurations and one IMR configuration.

Operation 2): the base station triggers the UE via DCI in the sub-frame n to make aperiodic CSI feedback, so that the UE feeds back positional information of the optimum CSI-RS resource.

Operation 3): the UE reports an index of the optimum one of the four CSI feedback configurations included in the CSI process, among all the CSI feedback configurations, to the base station over a PUSCH in the sub-frame n+4. The optimum CSI feedback configuration is a CSI-RS resource with the largest Reference Signal Received Power (RSRP) value, selected by the UE measuring RSRP of respective CSI-RS resources.

Operation 4): the UE measures CSI based upon the selected optimum CSI-RS resource in the sub-frame n+4, and the sub-frame n+9.

Operation 5): the base station further triggers the UE via DCI in the sub-frame n+10 to make aperiodic CSI feedback, so that the UE feeds back CSI measured over a CSI-RS resource corresponding to previously reported positional information.

Operation 6): the UE reports the CSI measured over the CSI-RS resource, corresponding to the index of the CSI feedback configuration reported in the operation 3), among all the CSI-RS resources in the CSI process, i.e., the selected optimum CSI-RS resource, to the base station over a PUSCH in the sub-frame n+14.

Second Embodiment

In this embodiment, CSI feedback is triggered by using an aperiodic CSI feedback triggering instruction, so that a UE reports positional information of a CSI feedback configuration periodically at a fixed position in each sub-frame, and thereafter performs CSI measurement for the CSI feedback configuration corresponding to the reported positional information, receives the aperiodic CSI feedback triggering instruction transmitted by a base station, and reports the CSI corresponding to the positional information, particularly in the following operations.

Operation 1): the base station indicates to the UE a CSI process for aperiodic CSI feedback via higher-layer signaling. The CSI process includes four CSI-RS resource configurations and one IMR configuration.

Operation 2): the UE reports an index of the optimum one of the CSI feedback configurations in the CSI process, among all the CSI feedback configurations to the base station over a PUCCH in the sub-frame n. The optimum CSI-RS resource configuration is determined by estimating channel capacities corresponding to each CSI-RS resource and the UE selects a CSI-RS resource with highest channel capacity.

Operation 3): the UE measures the CSI over the selected optimum CSI-RS resource in the sub-frames n+2 and n=7.

Operation 4): the base station triggers the UE via DCI in the sub-frame n+5 to make aperiodic CSI feedback.

Operation 5): the UE reports the CSI measured over the CSI-RS resource, corresponding to the index reported in the operation 2), among all the CSI-RS resources in the CSI process, i.e., the selected optimum CSI-RS resource, to the base station over a PUSCH in the sub-frame n+9.

Third Embodiment

In this embodiment, CSI feedback is triggered using an aperiodic CSI feedback triggering instruction. A UE determines a CSI feedback configuration, for which CSI needs to be fed back, indicated by a base station according to the aperiodic CSI feedback triggering instruction transmitted by the base station, and thereafter measures CSI based upon the CSI feedback configuration corresponding to positional information indicated by the base station, and reports the CSI corresponding to the positional information after the measurement, particularly in the following operations.

Operation 1): The base station indicates to the UE a set of CSI processes for aperiodic CSI feedback, via higher-layer signaling. The set of CSI processes includes four CSI processes, and each CSI process includes a CSI-RS resource configuration and an IMR configuration.

Operation 2): The base station triggers the UE via DCI in the sub-frame n to make aperiodic CSI feedback. The base station indicates an index of a CSI process for which the UE needs to feed back CSI, among all the four configured CSI processes, via two-bit information in the triggering signaling, and the information is positional information.

Operation 3): The UE measures CSI based upon the CSI process corresponding to the index among all the four configured CSI processes upon reception of the triggering signaling. Particularly the UE measures CSI in a two CSI-RS resources' period after the UE is triggered.

Operation 4): The UE reports the CSI measured based upon the CSI process to the base station over a PUSCH in the sub-frame n+12.

Based upon the same inventive conception, embodiments of the disclosure further provides a UE for feeding back CSI, and a base station for receiving CSI. Since these apparatuses address the problem under a similar principle to the method for feeding back CSI and the method for receiving CSI, reference can be made to the implementations of the methods for implementations of the apparatuses, and a repeated description thereof is omitted here.

Figure 7:
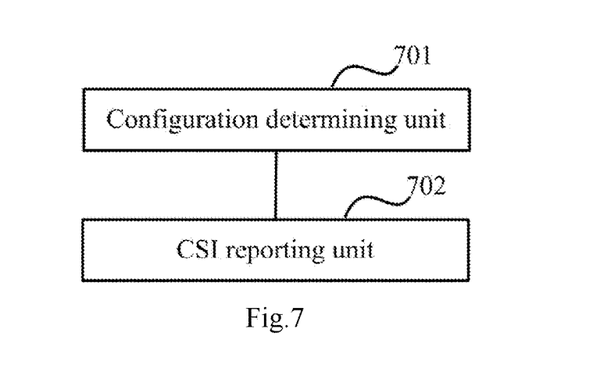
FIG. 7 is a schematic structural diagram of a UE according to an embodiment of the disclosure.

An embodiment of the disclosure provides a UE, and as illustrated in FIG. 7, the UE includes a configuration determining unit 701 and a CSI reporting unit 702.

The configuration determining unit 701 is configured to determine at least one set of CSI feedback configurations configured by a base station according to an indication of the base station. Each set of the CSI feedback configurations includes at least one CSI feedback configuration, and a CSI feedback configuration is a downlink signal configuration for downlink CSI measurement and feedback.

The CSI reporting unit 702 is configured to report CSI obtained based upon first CSI feedback configuration(s) to the base station over a PUCCH or a PUSCH upon determining that the CSI needs to be reported. The first CSI feedback configuration(s) is CSI feedback configuration(s) determined by the UE from corresponding set(s) of CSI feedback configurations according to most recently reported positional information of the CSI feedback configuration(s), or positional information of the CSI feedback configuration(s) indicated by the base station.

Optionally a CSI feedback configuration is a CSI process, or a NPZ CSI-RS configuration, or an IMR configuration.

Optionally a first CSI feedback configuration is a CSI feedback configuration corresponding to positional information of the CSI feedback configuration most recently reported by the UE over a PUCCH.

Optionally a first CSI feedback configuration is a CSI feedback configuration corresponding to positional information of the CSI feedback configuration most recently reported by the UE over a PUSCH.

Optionally a first CSI feedback configuration is a CSI feedback configuration corresponding to most recently reported positional information of the CSI feedback configuration among positional information of CSI feedback configurations reported by the UE over a PUCCH and a PUSCH.

Optionally the most recently reported positional information of the CSI feedback configurations are particularly most recently reported indexes of each CSI feedback configuration in corresponding set(s) of CSI feedback configurations which the CSI feedback configurations belong to.

Optionally the most recently reported positional information of the CSI feedback configuration is particularly most recently reported sequences of positions corresponding to the set of CSI feedback configurations which the CSI feedback configuration belongs to. One set of CSI feedback configurations corresponds to one sequence of positions, each CSI feedback configuration in the set of CSI feedback configurations corresponds to one bit in the sequence of positions, and the positional information was most recently reported by setting the bits corresponding to the CSI feedback configurations to be reported in the sequence of positions, which correspond to the CSI feedback configurations to be reported to a preset value, and then reporting the sequence of positions to the base station.

Optionally the configuration determining unit is configured to determine the positional information of the CSI feedback configuration indicated by the base station via aperiodic CSI triggering signaling or higher-layer signaling transmitted by the base station.

Optionally the UE further includes a signaling receiving unit. The signaling receiving unit is configured to receive downlink control signaling transmitted by the base station. The downlink control signaling instructs the UE to determine the first CSI feedback configuration based upon the most recently reported positional information of the CSI feedback configuration, or to determine the first CSI feedback configuration according to the positional information of the CSI feedback configuration indicated by the base station.

Figure 8:
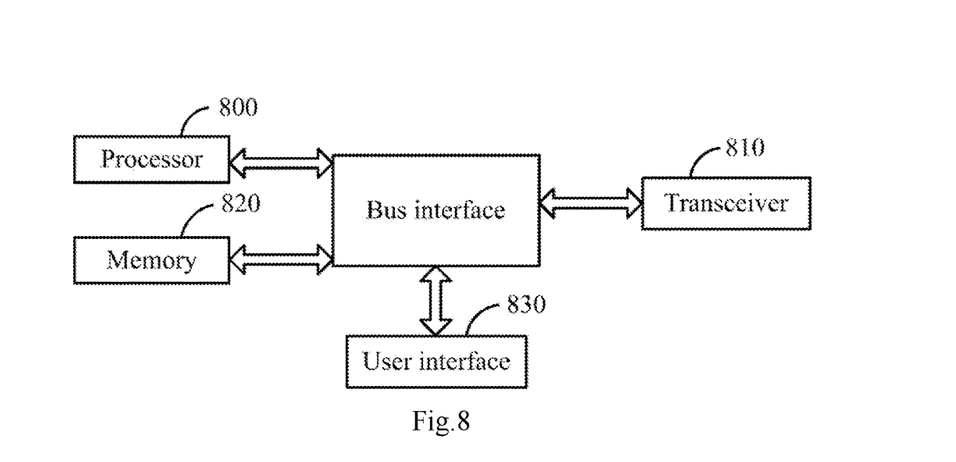
FIG. 8 is a structural diagram of a UE according to another embodiment of the disclosure.

An embodiment of the disclosure further provides a UE, and as illustrated in FIG. 8, the UE includes a processor 800, a transceiver 810, and a memory 820.

The processor 800 is configured to read and execute a program stored in the memory 820 to perform the following operations: determining at least one set of CSI feedback configurations configured by a base station according to an indication of the base station, where each set of the CSI feedback configurations includes at least one CSI feedback configuration, and a CSI feedback configuration is a downlink signal configuration for downlink CSI measurement and feedback; and reporting CSI obtained based upon a first CSI feedback configuration to the base station through the transceiver 810 over a PUCCH or a PUSCH upon determining that the CSI needs to be reported, where the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

The transceiver 810 is configured to be controlled by the processor 800 to receive and transmit data.

Here in FIG. 8, a bus architecture can include any number of interconnecting buses and bridges to particularly link together various circuits including one or more processors represented by the processor 800, and one or more memories represented by the memory 820.

The bus architecture can further link together various other circuits, e.g., prophetical devices, manostats, power management circuits, etc., all of which are well known in the art, so a further description thereof is omitted in this context. The bus interface serves as an interface. The transceiver 810 can include a number of elements, i.e., a transmitter and a receiver, which provide units for communication with various other devices over a transmission medium. For different user equipments, a user interface 830 can also be an interface via which desirable devices can be connected internally or externally, and the connected devices can include but are not be limited to a keypad, a display, a speaker, a microphone, a joystick, etc.

The processor 800 is responsible for managing the bus architecture and performing normal processes, and the memory 820 can store data for use by the processor 800 when performing the operations.

Figure 9:
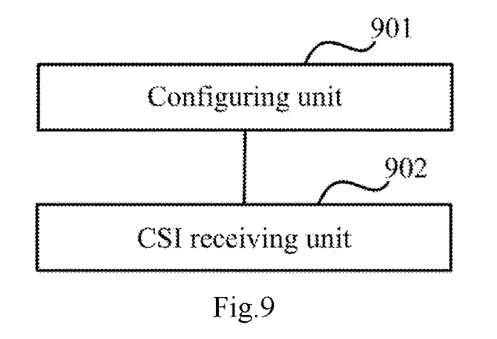
FIG. 9 is a schematic structural diagram of a base station according to an embodiment of the disclosure.

An embodiment of the disclosure further provides a base station, and as illustrated in FIG. 9, the base station includes a configuring unit 901 and a CSI receiving unit 902.

The configuring unit 901 is configured to configure a UE with at least one set of CSI feedback configurations, and to indicate the at least one set of CSI feedback configurations to the UE. Each set of CSI feedback configurations includes at least one CSI feedback configuration, and the CSI feedback configuration is a downlink signal configuration for downlink CSI measurement and feedback.

The CSI receiving unit 902 is configured to receive CSI obtained based upon a first CST feedback configuration, reported by the UE over a PUCCH or a PUSCH. The first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

Optionally the CSI feedback configuration is a CSI process, or an NPZ CSI-RS configuration, or an (IMR configuration.

Optionally the first CSI feedback configuration is a CSI feedback configuration corresponding to positional information of the CSI feedback configuration most recently reported by the UE over a PUCCH.

Or, the first CSI feedback configuration is a CSI feedback configuration corresponding to positional information of the CSI feedback configuration most recently reported by the UE over a PUSCH.

Or, the first CSI feedback configuration is a CSI feedback configuration corresponding to most recently reported positional information of the CSI feedback configuration among positional information of CSI feedback configurations reported by the UE over a PUCCH and a PUSCH.

Optionally the base station further includes an instructing unit. The instruction unit is configured to transmit downlink control signaling to the UE, The downlink control signaling instructs the UE to determine the first CSI feedback configuration based upon the most recently reported positional information of the CSI feedback configuration, or to determine the first CSI feedback configuration according to the positional information of the CSI feedback configuration indicated by the base station.

Figure 10:
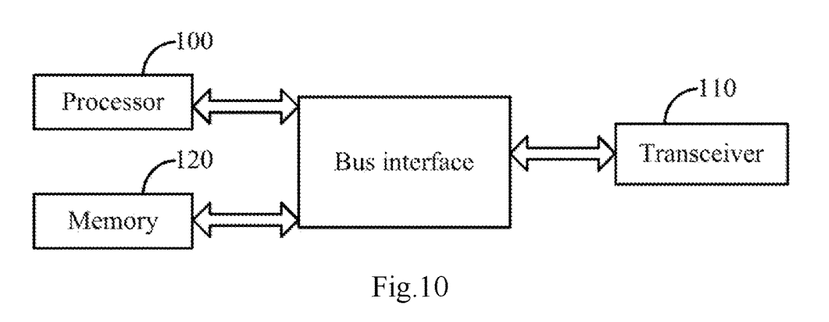
FIG. 10 is a structural diagram of a base station according to another embodiment of the disclosure.

An embodiment of the disclosure further provides a base station, and as illustrated in FIG. 10, the base station includes a processor 100, a transceiver 110, and a memory 120.

The processor 100 is configured to read and execute a program in the memory 120 to perform the following operations: configuring a UE with at least one set of CSI feedback configurations, and indicating the at least one set of CSI feedback configurations to the UE, where each set of CSI feedback configurations includes at least one CSI feedback configuration, and the CSI feedback configuration is a downlink signal configuration for downlink CSI measurement and feedback; and receiving CSI, obtained based upon a first CSI feedback configuration, reported by the UE over a PUCCH or a PUSCH through the transceiver 110, where the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

The transceiver 110 is configured to be controlled by the processor 100 to receive and transmit data.

Here in FIG. 10, a bus architecture can include any number of interconnecting buses and bridges to particularly link together various circuits including one or more processors represented by the processor 100, and one or more memories represented by the memory 120.

The bus architecture can further link together various other circuits, e.g., prophetical devices, manostats, power management circuits, etc., all of which are well known in the art, so a further description thereof is omitted in this context. The bus interface serves as an interface. The transceiver 110 can include a number of elements, i.e., a transmitter and a receiver, which provide units for communication with various other devices over a transmission medium. The processor 100 is responsible for managing the bus architecture and performing normal processes, and the memory 120 can store data for use by the processor 100 in performing the operations.

The disclosure has been described with reference to a flow chart and/or a block diagram of the method, the device (system) and the computer program product according to the embodiments of the disclosure. It shall be appreciated that each flow and/or block in the flow chart and/or the block diagram and combinations of the flows and/or the blocks in the flow chart and/or the block diagram can be embodied in computer program instructions. These computer program instructions can be loaded onto a processor of a general-purpose computer, a specific-purpose computer, an embedded processor or another programmable data processing device to produce a machine so that the instructions executed on the processor of the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for feeding back Channel State Information (CSI) by a User Equipment (UE), the method comprising:
   determining at least one set of CSI feedback configurations configured by a base station according to an indication of the base station, wherein each set of CSI feedback configurations comprises at least one CSI feedback configuration, and the CSI feedback configuration is a downlink signal configuration for downlink CSI measurement and feedback; and
   reporting CSI obtained based upon a first CSI feedback configuration to the base station over a Physical Uplink Control Channel (PUCCH) or a Physical Uplink Shared Channel (PUSCH) upon determining that the CSI needs to be reported, wherein the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

2. The method according to claim 1, wherein:
   the CSI feedback configuration is a CSI process, or a Non-Zero Power Channel State Information Reference Signal (NPZ CSI-RS) configuration, or an Interference Measurement Resource (IMR) configuration.

3. The method according to claim 1, wherein:
   the first CSI feedback configuration is a CSI feedback configuration corresponding to positional information of the CSI feedback configuration most recently reported by the UE over a PUCCH; or
   the first CSI feedback configuration is a CSI feedback configuration corresponding to positional information of the CSI feedback configuration most recently reported by the UE over a PUSCH; or
   the first CSI feedback configuration is a CSI feedback configuration corresponding to most recently reported positional information of the CSI feedback configuration among positional information of CSI feedback configurations reported by the UE over a PUCCH and a PUSCH.

4. The method according to claim 1, wherein the most recently reported positional information of the CSI feedback configuration is:
   a most recently reported index of the CSI feedback configuration in a corresponding set of CSI feedback configurations which the CSI feedback configuration belongs to; or
   a most recently reported sequence of positions corresponding to the set of CSI feedback configurations which the CSI feedback configuration belongs to, wherein one set of CSI feedback configurations corresponds to one sequence of positions, each CSI feedback configuration in the set of CSI feedback configurations corresponds to one bit in the sequence of positions, and the UE most recently reports the positional information by setting a bit corresponding to the CSI feedback configuration to be reported in the sequence of positions to a preset value, and then reporting the sequence of positions to the base station.

5. The method according to claim 1, wherein the positional information of the CSI feedback configuration indicated by the base station is:
   an index of the CSI feedback configuration in the set of CSI feedback configurations which the CSI feedback configuration belongs to; or
   a sequence of positions corresponding to the set of CSI feedback configurations which the CSI feedback configuration belongs to, wherein one set of CSI feedback configurations corresponds to one sequence of positions, each CSI feedback configuration in the set of CSI feedback configurations corresponds to one bit in the sequence of positions, and the base station indicates the positional information by setting a bit corresponding to the CSI feedback configuration to be reported in the sequence of position to a preset value, and then transmitting the sequence of positions to the UE.

6. The method according to claim 1, wherein the UE determines the positional information of the CSI feedback configuration indicated by the base station via aperiodic CSI triggering signaling or higher-layer signaling transmitted by the base station.

7. The method according to claim 1, wherein the method further comprises:
   receiving downlink control signaling transmitted by the base station, wherein the downlink control signaling instructs the UE to determine the first CSI feedback configuration based upon the most recently reported positional information of the CSI feedback configuration, or to determine the first CSI feedback configuration according to the positional information of the CSI feedback configuration indicated by the base station.

8. A method for receiving Channel State Information (CSI) by a base station, the method comprising:
   configuring a User Equipment (UE) with at least one set of CSI feedback configurations, and indicating the at least one set of CSI feedback configurations to the UE, wherein each set of CSI feedback configurations comprises at least one CSI feedback configuration, and the CSI feedback configuration is a downlink signal configuration for downlink CSI measurement and feedback; and
   receiving CSI, obtained based upon a first CSI feedback configuration and reported by the UE over a Physical Uplink Control Channel (PUCCH) or a Physical Uplink Shared Channel (PUSCH), wherein the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

9. The method according to claim 8, wherein:
the CSI feedback configuration is a CSI process, or a Non-Zero Power Channel State Information Reference Signal (NPZ CSI-RS) configuration, or an Interference Measurement Resource (IMR) configuration.

10. The method according to claim 8, wherein:
the first CSI feedback configuration is a CSI feedback configuration corresponding to positional information of the CSI feedback configuration most recently reported by the UE over a PUCCH; or
the first CSI feedback configuration is a CSI feedback configuration corresponding to positional information of the CSI feedback configuration most recently reported by the UE over a PUSCH; or
the first CSI feedback configuration is a CSI feedback configuration corresponding to most recently reported positional information of the CSI feedback configuration among positional information of CSI feedback configurations reported by the UE over a PUCCH and a PUSCH.

11. The method according to claim 8, wherein the method further comprises:
transmitting downlink control signaling to the UE, wherein the downlink control signaling instructs the UE to determine the first CSI feedback configuration based upon the most recently reported positional information of the CSI feedback configuration, or to determine the first CSI feedback configuration according to the positional information of the CSI feedback configuration indicated by the base station.

12. A User Equipment (UE), comprising:
a transmitter;
a processor; and
a memory storing at least one instructon, wherein the processor is configured to execute the at least one instruction to:
determine at least one set of Channel State Information (CSI) feedback configurations configured by a base station according to an indication of the base station, wherein each set of CSI feedback configurations comprises at least one CSI feedback configuration, and the CSI feedback configuration is a downlink signal configuration for downlink CSI measurement and feedback; and
control the transmitter to report CSI obtained based upon a first CSI feedback configuration to the base station over a Physical Uplink Control Channel (PUCCH) or a Physical Uplink Shared Channel (PUSCH) upon determining that the CSI needs to be reported, wherein the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

13. The UE according to claim 12, wherein:
the CSI feedback configuration is a CSI process, or a Non-Zero Power Channel State Information Reference Signal (NPZ CSI-RS) configuration, or an Interference Measurement Resource (IMR) configuration.

14. The UE according to claim 12, wherein:
the first CSI feedback configuration is a CSI feedback configuration corresponding to positional information of the CSI feedback configuration most recently reported by the UE over a PUCCH; or
the first CSI feedback configuration is a CSI feedback configuration corresponding to positional information of the CSI feedback configuration most recently reported by the UE over a PUSCH; or
the first CSI feedback configuration is a CSI feedback configuration corresponding to most recently reported positional information of the CSI feedback configuration among positional information of CSI feedback configurations reported by the UE over a PUCCH and a PUSCH.

15. The UE according to claim 12, wherein the most recently reported positional information of the CSI feedback configuration is:
a most recently reported index of the CSI feedback configuration in a corresponding set of CSI feedback configurations which the CSI feedback configuration belongs to; or
a most recently reported sequence of positions corresponding to the set of CSI feedback configurations which the CSI feedback configuration belongs to, wherein one set of CSI feedback configurations corresponds to one sequence of positions, each CSI feedback configuration in the set of CSI feedback configurations corresponds to one bit in the sequence of positions, and the UE most recently reports the positional information by setting a bit corresponding to the CSI feedback configuration to be reported in the sequence of positions to a preset value, and then reporting the sequence of positions to the base station.

16. The UE according to claim 12, wherein the positional information of the CSI feedback configuration indicated by the base station is:
an index of the CSI feedback configuration in the set of CSI feedback configurations which the CSI feedback configuration belongs to; or
a sequence of positions corresponding to the set of CSI feedback configurations which the CSI feedback configuration belongs to, wherein one set of CSI feedback configurations corresponds to one sequence of positions, each CSI feedback configuration in the set of CSI feedback configurations corresponds to one bit in the sequence of positions, and the base station indicates the positional information by setting a bit corresponding to the CSI feedback configuration to be reported in the sequence of position to a preset value, and then transmitting the sequence of positions to the UE.

17. The UE according to claim 12, wherein the processor is further configured to execute the at least one instruction to determine the positional information of the CSI feedback configuration indicated by the base station via aperiodic CSI triggering signaling or higher-layer signaling transmitted by the base station.

18. The UE according to claim 12, wherein the UE further comprises:
a receiver configured to be controlled by the processor to receive downlink control signaling transmitted by the base station, wherein the downlink control signaling instructs the UE to determine the first CSI feedback configuration based upon the most recently reported positional information of the CSI feedback configuration, or to determine the first CSI feedback configuration according to the positional information of the CSI feedback configuration indicated by the base station.

19. A base station, comprising:

a receiver;

a processor; and a memory storing at least one instructon, wherein the processor is configured to execute the at least one instruction to:

configure a User Equipment (UE) with at least one set of Channel State Information (CSI) feedback configurations, and to indicate the at least one set of CSI feedback configurations to the UE, wherein each set of CSI feedback configurations comprises at least one CSI feedback configuration, and the CSI feedback configuration is a downlink signal configuration for downlink CSI measurement and feedback; and control the receiver to receive CSI, obtained based upon a first CSI feedback configuration and reported by the UE over a Physical Uplink Control Channel (PUCCH) or a Physical Uplink Shared Channel (PUSCH), wherein the first CSI feedback configuration is a CSI feedback configuration determined by the UE from a corresponding set of CSI feedback configurations according to most recently reported positional information of the CSI feedback configuration, or positional information of the CSI feedback configuration indicated by the base station.

20. The base station according to claim 19, wherein:

the CSI feedback configuration is a CSI process, or a Non-Zero Power Channel State Information Reference Signal (NPZ CSI-RS) configuration, or an Interference Measurement Resource (IMR) configuration.

* * * * *